K. A. SIMMON.
ELECTRICAL SYSTEM.
APPLICATION FILED MAR. 4, 1916.
1,298,107.
Patented Mar. 25, 1919.
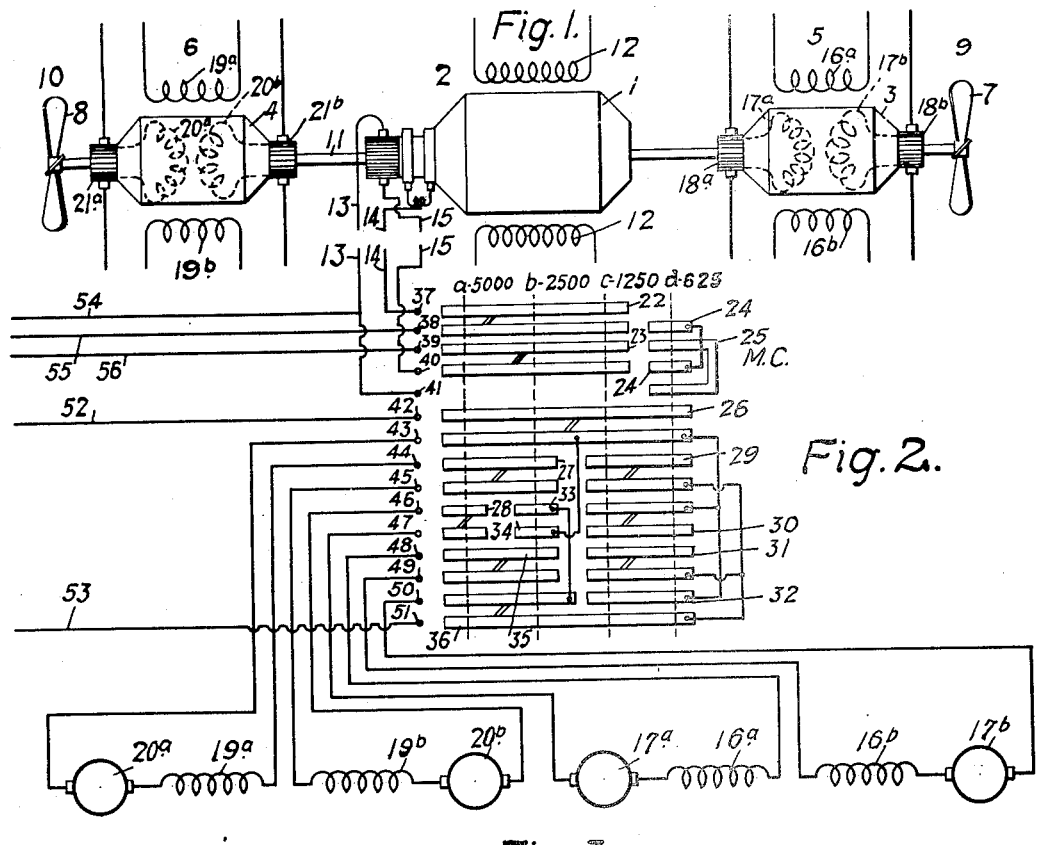
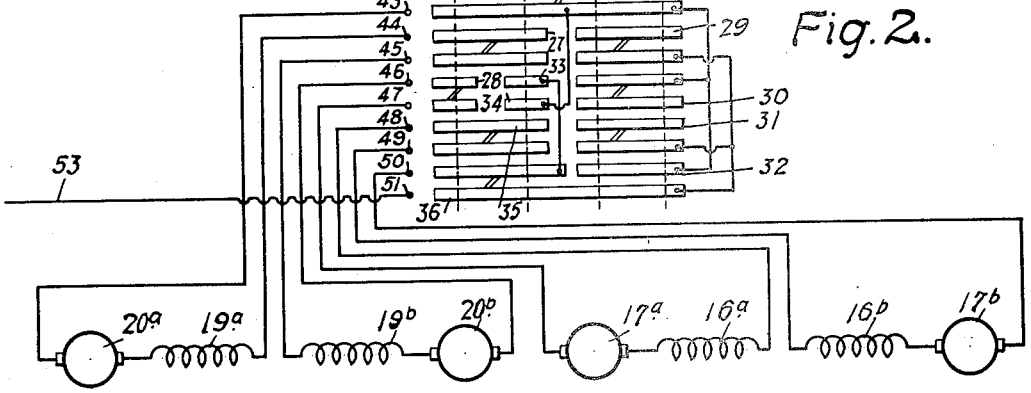
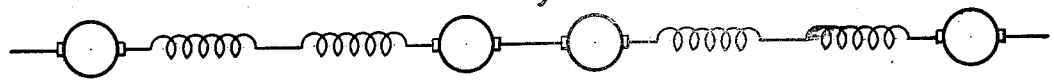
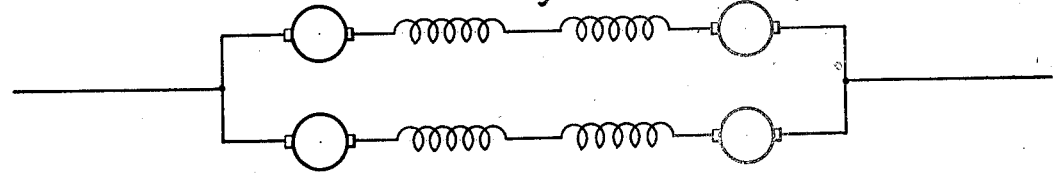
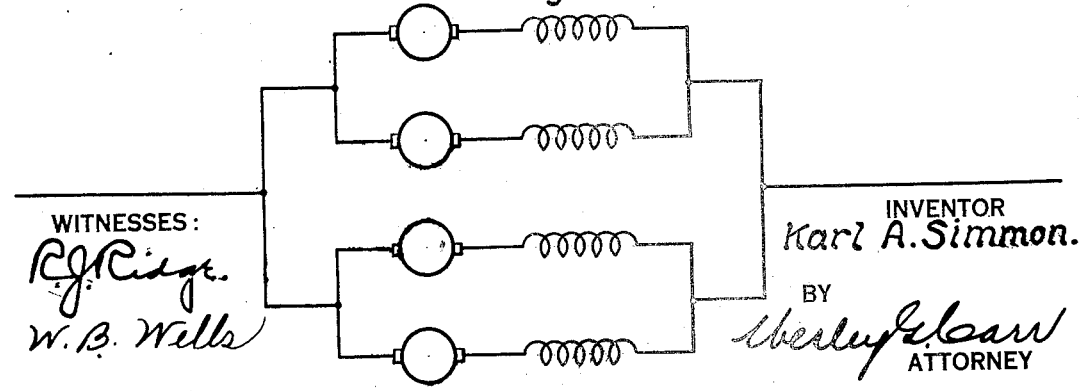
WITNESSES:
R.J.Ridge
W.B.Wells
INVENTOR
Karl A. Simmon.
BY
Wesley L. Carr
ATTORNEY

UNITED STATES PATENT OFFICE.

KARL A. SIMMON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

ELECTRICAL SYSTEM.

1,298,107.   Specification of Letters Patent.   Patented Mar. 25, 1919.

Application filed March 4, 1916. Serial No. 82,099.

*To all whom it may concern:*

Be it known that I, KARL A. SIMMON, a citizen of the United States, and a resident of Edgwood Park, in the county of Allegheny and State of Pennsylvania, have invented a new and useful Improvement in Electrical Systems, of which the following is a specification.

My invention relates to electrical systems adapted to be supplied with current from line circuits of relatively high and variable potentials and to deliver currents of a low and constant potential.

One object of my invention is to provide a system of the above indicated character which shall be simple and economical in construction and effective and reliable in operation.

Another object of my invention is to provide a system of the above indicated class that may be employed in an electric locomotive, car or similar electrical equipment which is adapted to operate on relatively high voltages, to furnish comparatively low-voltage currents for the lamps and the auxiliary apparatus thereof.

A further object of my invention is to provide an electric system with motors having means whereby the same may be connected to a supply circuit and be energized thereby so as to operate a generator at full capacity in case the voltage supplied to the motors varies between normal and one-quarter normal value and to operate the generator at one-half capacity in case the voltage of the current supplied to the motors is lowered to one-eighth normal value.

More specifically, my invention comprises a shaft having the armatures of a three-wire generator and of two motors and the rotating parts of two blowers mounted thereon. The armatures of the motors are provided with two independent windings and two commutators which may be connected in series, in series-parallel or in parallel-circuit relation to a supply circuit by means of a commutating switch. The blowers, which are mounted on the shaft with the armatures, permit the use of series motors and insure the latter of a constant load to prevent the same from having excessive speed in case the generator be relieved of the load thereon. The generator, by reason of the various connections that may be obtained between the motors and the supply circuit, may develop full voltage between the middle neutral lead and either of the outside leads in case the voltage of the supply circuit be reduced to one-quarter of its normal value and may develop full voltage between the outside leads in case the voltage of the supply circuit be reduced to one-eighth of its normal value.

In the accompanying drawing, Figure 1 is a diagrammatic view of the apparatus employed in a system constructed in accordance with my invention; Fig. 2 is a diagrammatic view of the circuits for controlling the operation of the motors illustrated in Fig. 1, and Figs. 3, 4 and 5 are views of the motor circuits completed in the various positions of the commutating switch shown in Fig. 2.

Referring to Fig. 1, the armature 1 of a three-wire generator 2, armatures 3 and 4 of motors 5 and 6 and rotating parts 7 and 8 of blowers 9 and 10, are mounted on a shaft 11. The three-wire generator 2 is excited by field windings 12, and the armature thereof is connected to leads 13, 14 and 15. The motor 5 is provided with field windings $16^a$ and $16^b$ and the armature thereof is provided with two windings $17^a$ and $17^b$ and two commutators $18^a$ and $18^b$. The motor 6 is provided with field windings $19^a$ and $19^b$ and the armature thereof is provided with two independent windings $20^a$ and $20^b$ and two commutators $21^a$ and $21^b$.

Referring to Fig. 2, a commutating switch MC embodies movable contact segments 22 to 36, inclusive, which are adapted to engage contact fingers 37 to 50, inclusive, to connect the leads of generator 1 to line wires 54, 55 and 56 and to connect the motors 5 and 6 to a supply circuit 52—53 when moved to positions $a$, $b$, $c$ and $d$.

In describing the operation of my system, it is assumed that the supply circuit 52—53 may be connected to line circuits of 5000 volts, 2500 volts, 1250 volts and 625 volts, respectively, it being understood, however, that my system is in no way limited to operation with line circuits, having voltages of the above values.

In case the supply conductors 52 and 53 be connected to a line circuit having a current of 5000 volts, the commutating switch is moved to position $a$ in order to energize the motors 5 and 6 and operate the generator 2 so as to develop normal voltage between leads 14 and 15 or leads 14 and 13 of the generator.

When the commutating switch is moved to position a, a circuit is completed from the conductor 52, through contact finger 42, switch segment 26, contact finger 43, armature winding 20ª, field winding 19ª, contact finger 44, switch segment 27, contact finger 45, field winding 19ᵇ, armature winding 20ᵇ, contact finger 46, switch segment 28, contact finger 47, armature winding 17ª, field winding 16ª, contact finger 48, switch segment 35, contact finger 49, field winding 16ᵇ, armature winding 17ᵇ, contact finger 50, switch segment 36 and contact finger 51 to the supply conductor 53. In this position of the switch controller, a circuit is completed through the motors 5 and 6 as, illustrated in Fig. 3. In the above position of the commutating switch MC, the generator lead 13 is directly connected to the line wire 54; the generator lead 14 is connected through the contact fingers 37 and 38 and the switch segment 22 to the line wire 55; and the generator lead 15 is connected through the contact fingers 39 and 40 and the switch segment 23 to the line wire 56.

When the switch is moved to position b, a circuit is completed from the supply conductor 52, through the contact finger 42, switch segment 26 where the circuit divides, one branch extending through contact finger 43, armature winding 20ª, field winding 19ª, contact finger 44, switch segment 27, contact finger 45, field winding 19ᵇ, armature winding 20ᵇ, contact finger 46, switch segments 33 and 36, and contact finger 51 to the supply conductor 53, and the second branch extending from the switch segment 26, through switch segment 34, contact finger 47, armature winding 17ª, field winding 16ª, contact finger 48, switch segment 35, contact finger 49, field winding 16ᵇ, armature winding 17ᵇ, contact finger 50, switch segment 36, and contact finger 51 to the supply conductor 53. In this position of the commutating switch, the windings of the motors 5 and 6 are connected as illustrated in Fig. 4, and, in case the supply circuit is connected to a line of 2500 volts, the generator 2 will be operated to develop its full voltage across leads 14 and 15 or leads 14 and 13. The generator leads 13, 14 and 15 are connected to line wires 54, 55 and 56, respectively, by the means described, in position a of the switch.

In case the commutating switch is moved to position c, a circuit is completed from the supply conductor 52 through the contact finger 42 and switch segment 26, where the circuit divides into four branches, the first branch extending from the switch segment 26 through contact finger 43, armature winding 20ª, field winding 19ª, contact finger 44, switch segments 29 and 36, and contact finger 51 to the supply conductor 53. The second branch extends from the switch segment 26 through the switch segment 30, contact finger 46, armature winding 20ᵇ, field winding 19ᵇ, contact finger 45, switch segments 29 and 36 and the contact finger 51 to the supply conductor 53. The third branch extends from the switch segment 26 through switch segment 30, contact finger 47, armature winding 17ª, field winding 16ª, contact finger 48, switch segments 31 and 36 and the contact finger 51 to the supply conductor 53. The fourth branch extends from the switch segment 26 through switch segment 32, contact finger 50, armature winding 17ᵇ, field winding 16ᵇ, contact finger 49, switch segments 31 and 36 and the contact finger 51 to the supply conductor 53. In this position of the commutating switch, the windings of the motors 5 and 6 are connected to the supply conductors 52 and 53, as illustrated in Fig. 5, and, in case the supply conductors 43 are connected to a line circuit having a current of 1250 volts, the generator 2 will be operated to generate its full voltage across leads 14 and 15 or leads 14 and 13.

In case the supply conductors 52 and 53 be connected to a line circuit of 625 volts, the commutating switch is moved to position d. In this position of the switch, the circuit of the motors remains the same as in position c of the switch, but the leads 13, 14 and 15 of the generator 2 which were connected to the line wires 54, 55 and 56, respectively, in positions a, b and c of the switch, are changed to maintain full voltage across line wires 54 and 55, and 55 and 56. The generator lead 13 is connected directly to the line wire 54 and is connected through contact finger 41, switch segment 25 and contact finger 39 to the line wire 56; the generator lead 15 is connected through contact finger 40, switch segment 24, and contact finger 38 to line wire 55; and the circuit from the generator lead 14 is broken at the contact finger 37.

I do not wish to be restricted to the specific circuit connections and arrangement and locations of parts herein set forth, because various modifications thereof may be effected without departing from the spirit and scope of my invention. I desire, therefore, that only such limitations shall be imposed as are indicated in the appended claims.

I claim as my invention:

1. In an electrical system, the combination with a generator, two motors having armature and field windings, two blowers, and a shaft for supporting the rotating parts of said generator, motors and blowers, of means for varying the relations of the armature and field windings of the motors in accordance with the voltage supplied thereto, whereby the voltage of the generator may be maintained substantially constant.

2. In an electrical system, the combination with a generator, two series motors, each of said motors having two independent armature windings and field windings, two blowers, and a shaft for supporting the rotating parts of said generator, motors and blowers, of means for varying the relations of said windings in accordance with the voltage supplied thereto, whereby the speed of the generator may be maintained substantially constant.

3. In an electrical system, the combination with a generator having an armature and field windings, two motors having armatures and field windings, and blowers having rotating parts, of a shaft for supporting the armatures of said motors and said generator and the rotating parts of said blowers, a supply circuit and means for electrically connecting said motors to the supply circuit, whereby the speed of said generator and said blower may be maintained constant in case the voltage of the supply circuit be lowered.

4. In an electrical system, the combination with a generator, two motors directly connected to said generator, and a supply circuit for said motors, of means for varying the connections of said motors to the supply circuit, whereby the generator may be operated at full capacity in case the voltage of the supply circuit be reduced approximately one-half or one-fourth of its normal value and may be operated at one-half capacity in case the voltage of the supply circuit be reduced to approximately one-eighth its normal value.

5. In an electrical system, the combination with two series motors having armatures and field windings, each of said motor armatures having two independent windings and two commutators, a generator having an armature and field windings, a shaft for supporting the armatures of said motors and said generators, and a supply circuit, of means for connecting the armature windings of said motors in series, series-parallel and parallel-circuit relation to said supply circuit, whereby the generator may be operated at full capacity in case the voltage of the line supply be lowered.

6. In an electrical system, the combination with two motors having armatures and field windings, each of said motor armatures being provided with two windings and two commutators, a three-wire generator having an armature and field windings, two blowers having rotating parts, a shaft for supporting the armatures of said motors and of said generator and the rotating parts of said blowers, and a supply circuit, of means for joining said motors to the supply circuit whereby the generator may be operated at full capacity in case the voltage of the supply circuit varies between normal and one-fourth normal value and may be operated at one-half capacity in case the voltage of the supply circuit varies between one-fourth and one-eighth normal value.

7. In an electrical system, the combination with a generator having armature and field windings, a plurality of motors having armature and field windings, and a shaft for supporting the rotating parts of the generator and the motors, of means for varying the circuit connections of the generator and the motors to maintain full load on the generator in case the voltage applied to the motors varies substantially.

8. In an electrical system, the combination with a generator having armature and field windings, a plurality of motors having armature and field windings, and a shaft for supporting the rotating parts of the generator and the motors, of means comprising a commutating switch for varying the circuit connections of the generator and the motors to maintain the generator voltage constant in case the voltage applied to the motor varies substantially.

9. In an electrical system, a generator, a plurality of motors for operating the generator, each of said motors having a plurality of independent field and armature windings, and a supply circuit for said motors, of means comprising a commutating switch for varying the circuit connections of the generator and the motors to maintain the generator voltage constant in case of variation in the voltage applied to the motors.

In testimony whereof, I have hereunto subscribed my name this 29th day of Feb. 1916.

KARL A. SIMMON